3,658,861
PROCESS FOR PREPARING PHENYL (TRIHALO-
METHYL) MERCURY COMPOUNDS
Dietmar Seyferth, Lexington, Mass., and Robert L. Lambert, Jr., Seneca Falls, N.Y., assignors to Massachusetts Institute of Technology, Cambridge, Mass.
No Drawing. Filed Sept. 8, 1969, Ser. No. 856,209
Int. Cl. C07f 3/12
U.S. Cl. 260—433                 9 Claims

ABSTRACT OF THE DISCLOSURE

An aryl (halomethyl) mercury compound of the formula:

$$R\text{---}HgC(H)_{n-1}(X)_{4-n}$$

wherein R is substituted or unsubstituted aryl, X is halogen and $n$ is 1 or 2 is obtained by reacting an aryl mercuric halide, an alkali metal alkoxide and either dihalomethane or a trihalomethane at a temperature between $-80°$ C. and $0°$ C. The reaction is carried out in a highly polar ethereal solvent for the aryl mercuric halide reactant. The aryl (halomethyl) mercury compounds form dihalocarbenes in situ to react with base-sensitive or weakly nucleophilic olefins to form the respective gem-dihalocyclopropanes.

---

This invention relates to a process for preparing aryl (halomethyl) mercury compounds. More particularly the present invention relates to an improved process for preparing aryl (halomethyl) mercury compounds including those which form dihalocarbenes in situ.

Compounds which can be decomposed to form dihalocarbenes in situ find use in a wide variety of reactions. For example, dihalocarbenes are reactive with base-sensitive and/or weakly nucleophilic olefins to form the respective gem-dihalocyclopropanes. The gem-dihalocyclopropanes produced therefrom have many uses. Thus, the gem-dihalocyclopropanes formed from ketene acetals are readily pyrolyzed to alpha-organoacrylic esters in the manner shown in the Journal of American Chemical Society, vol 81, page 2579 (1959). In addition, a large number of gem-dihalocyclopropanes are useful as fungicides and herbicides as shown by U.S. Pat. 3,012,079.

Aryl (trihalomethyl) mercury compounds have been found to be highly effective for forming dihalocarbene in situ. These aryl (halomethyl) mercury compounds are represented by Formula I:

$$R\text{---}HgC(X)_3 \quad\quad\quad (I)$$

wherein R is substituted or unsubstituted aryl including phenyl, naphthyl, diphenyl and condensed aromatic such a phenanthryl, anthryl or the like which can be substituted as for example with halogen or alkyl; X is halogen including chlorine, bromine, fluorine and iodine, and X's can be the same or different. Under proper reaction conditions, the aryl (trihalomethyl) mercury compounds represented by Formula I decompose to form the reactive dihalocarbene in situ and an aryl mercuric halide. When a base-sensitive and/or a weakly nucleophilic olefin is present in the reaction medium, reaction is effected with the dihalocarbene to form the corresponding dihalocyclopropane which is subsequently recovered.

The compounds represented by Formula I are presently prepared by reacting an aryl mercuric halide, a trihalomethane and potassium tert. butoxide-tert. butanol monosolvate in a reaction medium comprising either benzene or diethyl ether. The reaction is represented by the following Equation I:

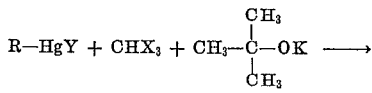
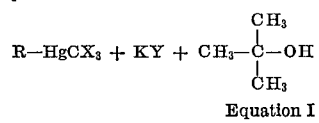

Equation I wherein R is defined above and Y and X are halogen. Unfortunately the processes now employed for preparing the compounds represented by Formula I have substantial disadvantages which render the incentive for using these compounds as dihalocarbene donors marginal at best. Since aryl (trihalomethyl) mercury compounds are very effective dihalocarbene donors, there is presently a strong incentive to eliminate or reduce the disadvantages of the processes now employed for their preparation. These disadvantages are believed to be primarily due to solvents now employed in the reaction medium.

When benzene is employed as a solvent or dispersant to prepare the aryl (trihalomethyl) mercury compounds, highly specialized and expensive equipment is necessitated since both the aryl mercuric halide and potassium tert. butoxide monosolvate are insoluble therein. It is therefore essential to effect high speed stirring of the reaction medium preferably in a creased flask in order to obtain significant yields of pure product.

By the phrase "high speed stirring" as employed herein is meant stirring speeds of ca. 20,000 r.p.m. or above. The use of presently available apparatus which effects high speed stirring is undesirable since it is expensive and is not easily adapted for use in large batch or continuous processes. On the other hand, conventional stirring methods, such as with a paddle stirrer or the like are easily adaptable for use with large batch or continuous processes and are therefore preferable to high speed stirring.

It has also been proposed to employ diethyl ether as a solvent or dispersant for the reactants even though it does not dissolve aryl (halomethyl) mercury compounds. While process advantages are obtained with diethyl ether as compared to benzene in that yields are somewhat higher, other disadvantages are introduced. Thus, is has been found that bromo-substituted phenyl (trihalomethyl) mercury compounds are unstable in the presence of diethyl ether. This necessitates immediate and rapid separation of the diethyl ether and the product. Even though immediate and rapid separation is effected, a reduced yield of pure product is obtained. Since the bromo-substituted phenyl (trihalomethyl) mercury compounds have been found to be the most effective dihalocarbene donors, this loss in yield when diethyl ether is employed is highly undesirable.

Process disadvantages in addition to those described above are also present when benzene or diethyl ether are employed. When these solvents are employed it is not possible to obtain satisfactory yields of the aryl (trihalomethyl) mercury compounds when employing as a reactant tert. butanol monosolvate prepared directly from commercially available potassium tert. butoxide. It is now necessary to prepare the monosolvate by a time consuming procedure which assures that the monosolvate is substantially free of water. A typical procedure now used to prepare the monsolvate reactant is described in J. Am. Chem. Soc., 84, 854–859 (1962). This procedure extends the time needed to form the final product, aryl (trihalomethyl) mercury, from the starting materials; aryl mercuric halide, potassium tert. butoxide and trihalomethane. The time required to prepare the final product from these starting materials is about three days. It therefore would be highly desirable to provide a process for substantially reducing the time necessary to prepare the final product in order to improve the economy of the process.

In addition, the present processes require a large excess of the trihalomethyl reactant in order to obtain the desired reaction. This is undesirable since many of the trihalomethanes, particularly bromo-substituted trihalomethanes are expensive. Accordingly, it would be desirable to provide a process for producing aryl (trihalomethyl) mercury compounds while employing substantially less trihalomethane reactant.

In accordance with the present invention there is provided a process for producing aryl (trihalomethyl) mercury compounds represented by Formula I as well as aryl (dihalomethyl) mercury compounds which process obviates the disadvantages described above. The process of the present invention is based upon the finding that when the reaction of an aryl mercuric halide, a halomethane and an alkali metal alkoxide base is carried out in a highly polar ethereal solvent, substantial process advantages are obtained. Suitable highly polar ethereal solvents are those employed in the preparation of organometallic compounds and are disclosed in Organometallic Compounds by Coates, Green and Wade, published by Methuen, 1967, pages 59–61. When employing the process of this invention, the reaction can be effected without employing high speed stirring. This result is surprising since the alkali metal alkoxide base is insoluble in the solvent employed. In addition, when potassium tert. butoxide monosolvate reactant is used in the process of this invention, it can be prepared directly from commercially available potassium tert. butoxide and the molar amount of halomethane reactant needed to effect reaction is substantially less than that needed in present processes. The process of this invention is also adapted for the production of aryl (dihalomethyl) mercury compounds which find utility as reagents for the preparation of monohalocyclopropanes and monohalomethylsilicon compounds.

In accordance with the present invention, an aryl mercuric halide, a dihalomethane or a trihalomethane and an alkali metal alkoxide base are reacted in the solvent. Suitable bases which can be employed are alkali metal alkoxides such as potassium tert. butoxide, sodium methoxide, potassium tert. amyloxide, sodium tert. amyloxide or the like either in the solvated or unsolvated form. It is preferred to employ tetrahydrofuran (THF) as the solvent in the process of this invention. However, it is expected that other highly polar ethereal solvents for the aryl mercuric halide reactant can be employed in the process of this such as glyme or diglyme. It is preferred to employ either solvated or unsolvated potassium tert. butoxide as the base. The description below is given in terms of the preferred process of this invention and it is to be understood that the description applies equally to the other solvents and bases described above.

The reaction is represented by the following Equation II:

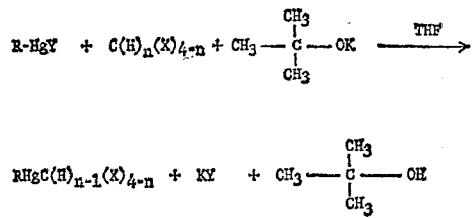

Equation II wherein R and X are defined above, Y is halogen and $n$ is 1 or 2.

The reaction is carried out in an atmosphere which is inert to the reactants and the product such as a nitrogen atmosphere or an inert gas atmosphere. A reduced reaction temperature is employed to prevent thermal decomposition of the products and reactants but not so low as to effect gelation of the reaction medium or substantially reduce the rate of reaction. Suitable rates of reaction and yield of pure product are obtained when employing a reaction temperature between about $-80°$ C. and $0°$ C., preferably between about $-80°$ C. and $-20°$ C.

The reaction can be carried out when employing the halomethyl reactant in amounts of between 1 mole and 4 moles per mole of aryl mercuric halide reactant. However, it is preferred to employ as little halomethyl reactant as needed to effect substantially complete reaction of the aryl mercuric halide. It is preferred to employ the halomethyl reactant in amounts of between 1 and 1.5 moles per mole of aryl mercuric halide reactant. The solvated or unsolvated base such as potassium tert. butoxide is employed in amounts of between about 1 and 2 moles per mole of aryl mercuric halide.

Exemplary suitable aryl mercuric halides are:

phenylmercuric chloride
phenylmercuric bromide
o-tolylmercuric chloride
p-tolylmercuric bromide
2,4-dichlorophenylmercuric chloride
diphenylylmercuric bromide and the like.

Exemplary suitable halomethyl reactants are:

dibromomethane
trichloromethane
bromodichloromethane
dibromochloromethane
bromodiiodomethane and the like.

Representative of the products obtained are:

phenyl (bromodichloromethyl) mercury
phenyl (dibromochloromethyl) mercury
phenyl (dibromofluoromethyl) mercury
phenyl (diiodobromomethyl) mercury
phenyl (triiodomethyl) mercury
phenyl (iodobromochloromethyl) mercury
phenyl (trichloromethyl) mercury
2,4-dichlorophenyl (tribromomethyl) mercury
o-tolyl (tribromomethyl) mercury
p-tolyl (tribromomethyl) mercury
diphenylyl (bromodichloromethyl) mercury and the like.

The potassium tert. butoxide reactant can be employed either as the tert. butanol monosolvate or in the unsolvated form depending upon the type of halomethane reactant employed. When a dihalomethane reactant is employed, the potassium tert. butoxide can be in the solvated or unsolvated form to obtain relatively high yields of pure product. When the trihalomethane reactant is employed, the potassium tert. butoxide is employed in the solvated form since only relatively low yields of pure product are obtained when employing the unsolvated butoxide reactant.

As stated above, a substantial advantage obtained with the present invention is that the tert. butoxide reactant can be directly prepared from commercially available potassium tert. butoxide which results in a substantial reduction of reaction time needed to prepare the product from the starting materials. The solvated butoxide can be prepared by first dissolving the potassium tert. butoxide in THF and subsequently adding thereto an equivalent amount of tert. butanol. The fine dispersion which results can then be employed in the reaction. In addition, the aryl (halomethyl) mercury compounds can be prepared from solvated potassium tert, butoxide prepared by the presently employed time consuming methods such as disclosed in J. Am. Chem. Soc., 84, pp. 854–859 (1962). Accordingly it is to be understood that the present invention includes the use of solvated butoxide reactant prepared by any known methods.

Since the solubility of aryl mercuric halides reactant in the solvent is dependent upon the particular aryl mercuric halide, the solvent and the reaction temperature, the amount of solvent used in the reaction medium depends upon the amount of product desired. For example, phenyl mercuric chloride is soluble in THF in concentration as follows: about 0.26 M at 28° C., about 0.2 M at 6° C. and about 0.14 M at −22° C. The amount of solvent employed in the present invention is that which will provide a reaction mixture having a low viscosity to promote ease of stirring and to effectively disperse or solubilize the phenyl mercuric halide reactant employed.

In carrying out the process of this invention, it is preferred that aryl mercuric halide and unsolvated potassium tert. butoxide are each dissolved in separate THF solutions. Operating in this manner permits improved dispersion of the solvated butoxide when tert. butanol is added to the butoxide to form the monosolvate. This promotes substantially complete reaction when the monosolvate dispersion and aryl mercuric halide solution are mixed in the presence of the halomethyl reactant. It is preferred to add the monosolvate dispersion at a relatively slow rate to the aryl mercuric halide-halomethane mixture in THF since improved yields are obtained thereby. During reaction, the reaction mixture is stirred at a moderate rate with a conventional stirrer, such as a simple paddle-type stirrer. At the reaction condition set forth above, the reaction is complete in less than about one-half hour. Upon completion of the reaction, the product recovery is effected by first removing the THF from the reaction mixture. The removal of THF is effected at room temperature or below in order to substantially prevent decompositions of the aryl (halomethyl) mercury product. The residue is then warmed to between 20° C. and about 25° C. and extracted with benzene (which dissolves the aryl (halomethyl) mercury product) and water successively. The potassium halide and tert. butanol byproducts are dissolved in the aqueous layer which is then decanted. The remaining organic layer is then evaporated to leave the aryl (halomethyl) mercury product which can then be purified as for example by conventional recrystallization techniques. While it is preferred to dissolve the potassium tert. butoxide and aryl mercuric halide in separate THF solutions, it is to be understood that reaction also can be effected by first mixing the aryl mercuric halide and potassium tert. butoxide in THF and then adding the haloform reactant to the mixture.

Suitable organic solvents which can be employed to dissolve the product are those which do not react therewith and include aromatic hydrocarbons such as benzene, toluene, xylene, and the like; alkanes such as hexanes, heptanes, octanes, decanes, dodecanes, pentadecanes, octadecanes, eicosanes and the like; cyclohexanes, petroleum ether, kerosene or the like.

The following examples illustrate the present invention and are not intended to limit the same.

EXAMPLE 1

In accordance with the procedure described below, phenyl mercuric chloride and potassium tert. butoxide were reacted with one of the following haloforms; dichlorobromomethane, chlorobromomethane or tribromomethane.

This example illustrates that satisfactory product yields are obtained from potassium tert. butoxide monosolvate directly prepared from commercially available potassium tert. butoxide without the need for extended periods of time to prepare the monosolvate.

Into a dry (flamed out) one liter, three-necked flask equipped with a nitrogen inlet tube and a glass-sleeved Tru-Bore stirrer with Teflon paddle was transferred 50.0 g. (0.16 mole) of phenylmercuric chloride. The material which remained in the weighing beaker was rinsed into the flask with 200 ml. of THF. To this was added 0.24 mole of the haloform, followed by a 100 ml. THF rinse. This mixture was stirred (using a standard Laboratory stirring motor) and maintained at −25° C. during the entire reaction time by external cooling (limited Dry Ice in acetone). The contents of a 25 g. bottle of commercial potassium tert. butoxide (ca. 0.22 mole) were quickly transferred under nitrogen into a dry 500 cc. single necked flask containing a magnetic stirring bar. 150 ml. of THF was added to the potassium tert. butoxide and the resultant mixture was stirred under nitrogen until all of the base had dissolved. To this solution was added under nitrogen with stirring, by means of a pressure-equalizing dropping funnel. 16.5 g. (0.22 mole) of tert. butanol in 50 ml. of THF over a 10 minute period. The resulting monosolvate formed a yellowish suspension which was cooled to room temperature and transferred to an additional funnel fixed to the third neck of the reaction flask. The monosolvate suspension was added to the cooled phenyl mercuric chloride/haloform THF solution over a 15–20 min. period. Upon completion of the addition, the reaction mixture was stirred for 5 min. at 25° C., then was transferred into a two-liter, one-necked flask.

The THF solvent was stripped off rapidly from the reaction mixture at reduced pressure using a rotary evaporator with a trap immersed in a −78° C. bath (water aspirator vacuum). No heating was applied until nearly all of the THF solvent had been removed. The residue was then warmed using a water bath to a temperature of about 20–25° C. Reagent grade benzene (800 ml.) was added to the dry residue and the mixture was shaken until the solid had partially dissolved. Subsequently, 100 ml. of distilled water was added and the mixture shaken thoroughly. The phases were allowed to settle and the benzene layer was decanted through a filter into a two-liter, one-necked flask. The aqueous layer was washed with another 200 ml. of benzene. The benzene extract and washings were evaporated at reduced pressure and the residue quickly dissolved in hot 3:1 hexane-chloroform; approximately 600 ml. of 3:1 hexane-chloroform was heated to boiling and added in portions to the solid, with vigorous swirling after each addition, until nearly all of the solid had dissolved. Mild heating on the steam bath was at times necessary. The hot solution was filtered through filter paper into a one-liter Erlenmeyer flask (thus removing some phenylmercuric halide which had not dissolved) and immediately chilled in a freezer below 0° C. The first crop was suction-filtered using a sintered glass funnel. Usually a thin flaky mat of phenyl mercuric chloride covered the sintered disc and the dense white needles of the phenyl (trihalomethyl) mercury compound were on the top. The latter usually could be easily separated from the mat of phenyl mercuric chloride. A wash with cold hexane followed the filtration. The mother liquor was evaporated to dryness at reduced pressure and the residue crystallized again as before from 3:1 hexane-chloroform to give a second crop of product. (About 60 ml. of the hot 3:1 solvent mixture will dissolve about 10 g. of phenyl (trihalomethyl) mercury.) A third crop of product usually was isolated by renewed concentration of the mother liquor and crystallization of the residue.

The yields obtained with each haloform reactant are set forth in Table I.

TABLE I

| Haloform reactant | Product | Product yield (g.) | Product yield (percent theoretical) | Product, M.P., °C. |
|---|---|---|---|---|
| $CHCl_2Br$ | $PhHgCCl_2Br$ | 50.4 | 72 | 108.0–110.0 |
| $CHClBr_2$ | $PhHgCClBr_2$ | 53.1 | 68 | 107.0–109.0 |
| $CHBr_3$ | $PhHgCBr_3$ | 61.9 | 73 | 119.0–120.0 |

As shown by this example, phenyl (trihalomethyl) mercury compounds can be obtained in high yields without the need for high speed stirring, without employing successive concentrations of haloform reactants and while employing the butoxide monosolvate obtained directly from commercially available potassium tert. butoxide.

EXAMPLE 2

This example illustrates that the process of this invention can be employed with potassium tert. butoxide monosolvate prepared by present procedures. The monosolvate was prepared in accordance with the procedure disclosed in J. Am. Chem. Soc., 84, pages 854–859 (1962). Potassium (4 grams) was dissolved in 100 ml. of tert. butanol which had been previously distilled over sodium. The excess tert. butanol was removed by distillation until the butoxide monosolvate crystals had formed. The monosolvate was reacted with the phenyl mercuric chloride in accordance with the general procedure set forth in Example 1.

The monosolvent was weighed under a dry nitrogen atmosphere. In each reaction system described below, the monosolvate was transferred to the phenyl mercuric chloride/haloform/THF solution via a flexible one inch diameter rubber tube.

In one reaction system, 0.1 mole of the monosolvate was reacted with 0.1 mole phenyl mercuric chlorine, and 0.12 mole bromodichlomethane at 78° C. to obtain a yield of 74% theoretical of phenyl (bromodichloromethyl) mercury.

When employing bromochloromethane as the haloform in the reaction system described above in this example, the yield of phenyl (chlorodibromomethane) mercury was 71% theoretical.

When employing bromoform as the haloform in the reaction system described above in this example, the yield of phenyl (tribromomethyl) mercury was 70% theoretical.

As shown by this example, high yields of phenyl (trihalomethyl) mercury compounds are obtained by the process of this invention even when the butoxide monosolvate is not prepared directly from potassium tert. butoxide.

EXAMPLE 3

This example illustrates that phenyl (dihalomethyl) mercury compounds can be prepared by the process of this invention.

The reaction of 0.2 mole of phenyl mercuric chloride, 0.3 mole of dibromomethane and 0.22 mole of unsolvated potassium tert. butoxide at 5° C. was carried out in accordance with the procedure described in Example 1. The yield of phenyl (dibromethyl) mercury was 65% of theoretical. The product had a melting point of 67.0–68.5° C.

We claim:

1. The process for making an aryl (halomethyl) mercury compound of the formula:

$$R-HgC(H)_{n-1}(X)_{4-n}$$

wherein R is aryl; X is halogen and $n$ is 1 or 2 which comprises reacting an aryl mercuric halide, potassium tert. butoxide and a halomethane selected from the group consisting of a dihalomethane and a trihalomethane at a temperature between about −80° C. and about 0° C., said reaction being carried out in tetrahydrofuran solvent and recovering said aryl (halomethyl) mercury compound.

2. The process of claim 1 wherein the potassium tert. butoxide is in the form of the tert. butanol monosolvate and the halomethyl reactant is a trihalomethane.

3. The process of claim 1 wherein the potassium tert. butoxide is in the unsolvated form and the halomethane reactant is a dihalomethane.

4. The process of claim 2 wherein at least one X is bromine and the halomethane reactant has at least one bromine atom.

5. The process of claim 2 wherein the halomethane is bromodichloromethane.

6. The process of claim 2 wherein the halomethane is dibromochloromethane.

7. The process of claim 2 wherein the halomethane is tribromomethane.

8. The process of claim 3 wherein the halomethane is dibromomethane.

9. The process of claim 2 wherein the monosolvate is obtained by mixing a solution of potassium tert. butoxide in tetrahydrofuran with tert. butanol.

References Cited

Holan, Tetrahedron Letters, vol. 18, pp. 1985–90 (1966).

Seyferth et al., J. Organometal. Chem., vol. 4, pp. 127–37 (1965).

Logan, Organic Synthesis, vol. 46, pp. 98–101 (1966).

TOBIAS E. LEVOW, Primary Examiner

H. M. S. SNEED, Assistant Examiner